United States Patent [19]

Jarvis et al.

[11] 4,137,173
[45] Jan. 30, 1979

[54] TRAP FOR GREASE OR OTHER FOREIGN MATTER DISSOLVED OR ENTRAINED IN A LIQUID

[76] Inventors: Cyril L. Jarvis, 271 Cowie Rd., Durban, Natal, South Africa; Laurence Ayers, Box 449, Bulawayo; Trevor Hewitt, 36 Cleeve Rd., Montrose, Bulawayo, both of Southern Rhodesia

[21] Appl. No.: 746,613

[22] Filed: Dec. 1, 1976

[51] Int. Cl.² .................... B01D 35/00; B01D 21/02
[52] U.S. Cl. ................................ 210/187; 210/521; 210/532 R
[58] Field of Search ............ 210/71, 72, 83, 178, 210/187, 532, 521, DIG. 25, 242, 167

[56] References Cited

U.S. PATENT DOCUMENTS

| | | | |
|---|---|---|---|
| 1,355,070 | 10/1920 | Allen | 210/532 R |
| 1,702,612 | 2/1929 | Morse | 210/532 X |
| 1,760,229 | 5/1930 | Arndt | 210/532 |
| 2,071,160 | 2/1937 | Boosey | 210/532 |
| 2,581,341 | 1/1952 | Alexander | 210/532 R |
| 2,611,488 | 9/1952 | Reson | 210/532 X |
| 2,834,471 | 5/1958 | Gibson | 210/532 U |
| 3,374,894 | 3/1968 | Webster | 210/532 R X |
| 3,701,429 | 10/1972 | Schell | 210/DIG. 21 |
| 3,716,140 | 2/1973 | Keating | 210/167 |
| 3,847,814 | 11/1974 | Adachi | 210/532 R X |
| 3,853,767 | 12/1974 | Mohn | 210/DIG. 25 |
| 3,853,768 | 12/1974 | Bagnulo | 210/DIG. 25 |
| 4,024,063 | 5/1977 | Mori | 210/242 R |

*Primary Examiner*—Theodore A. Granger
*Attorney, Agent, or Firm*—Young & Thompson

[57] ABSTRACT

A trap for grease or other foreign matter dissolved or entrained in a liquid comprises a housing containing a chamber for receiving the liquid to be treated, a turbulence reducing channel for conducting the liquid from the chamber to a settling tank, a cage for trapping trash as the liquid enters the tank, a grease collector at the normal surface level of the liquid in the tank, a trap for collecting sediment at the base of the tank and an outlet for draining decontaminated liquid from the tank. The outlet may be in communication with a liquid seal and means may be provided to syphon the liquid from the settling tank. Means may also be provided to cool the liquid in the housing. The housing is in modular form which is preferably segmental in plan. An assembly of such modules may be constructed with a common outlet in the shape of an all but complete circle or polygon. In this way access may easily be gained to the trap for servicing, maintenance and repairs. In addition weirs are provided between adjacent modules to ensure a balanced control of liquid being treated.

12 Claims, 7 Drawing Figures

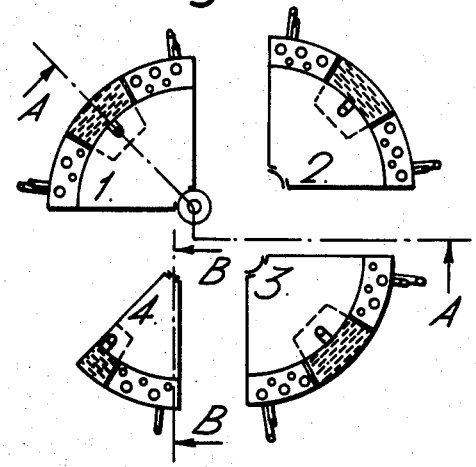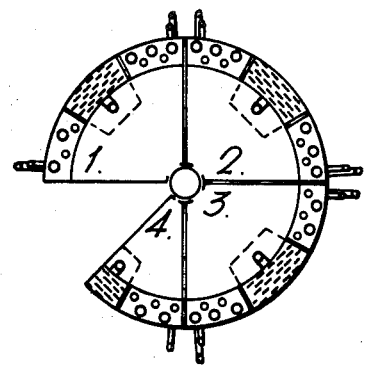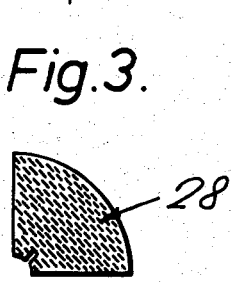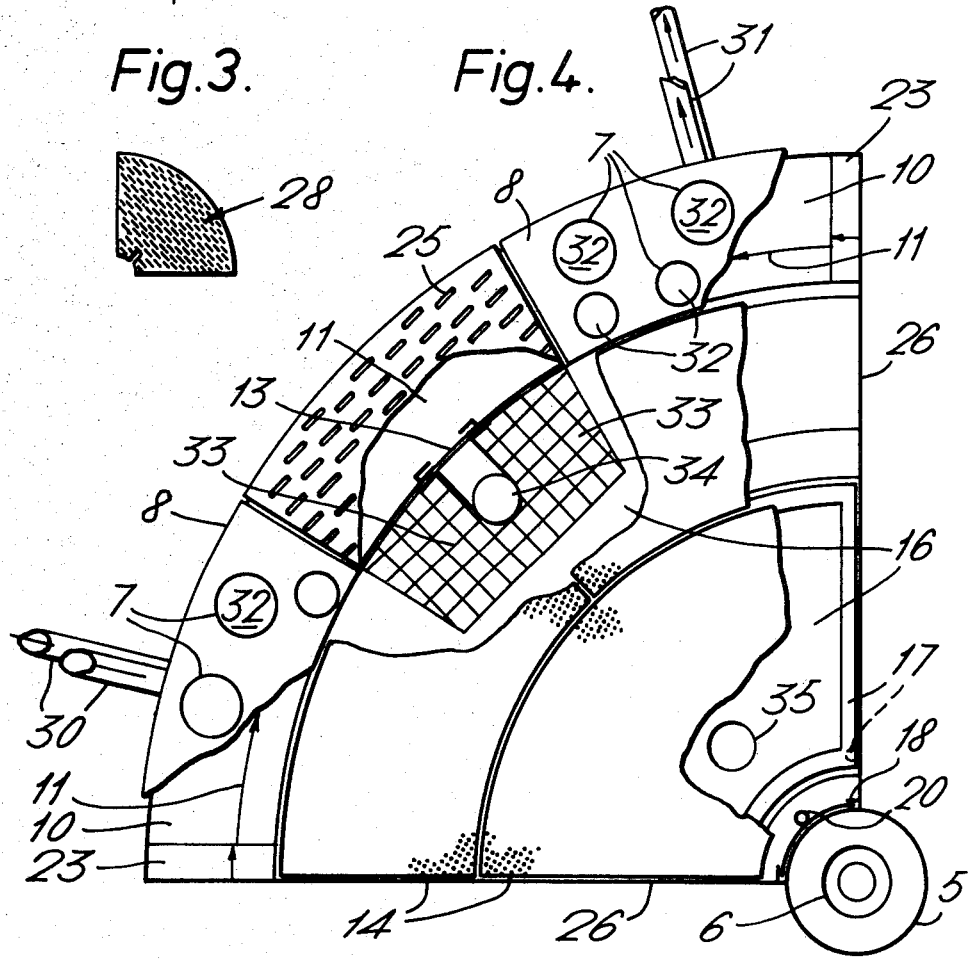

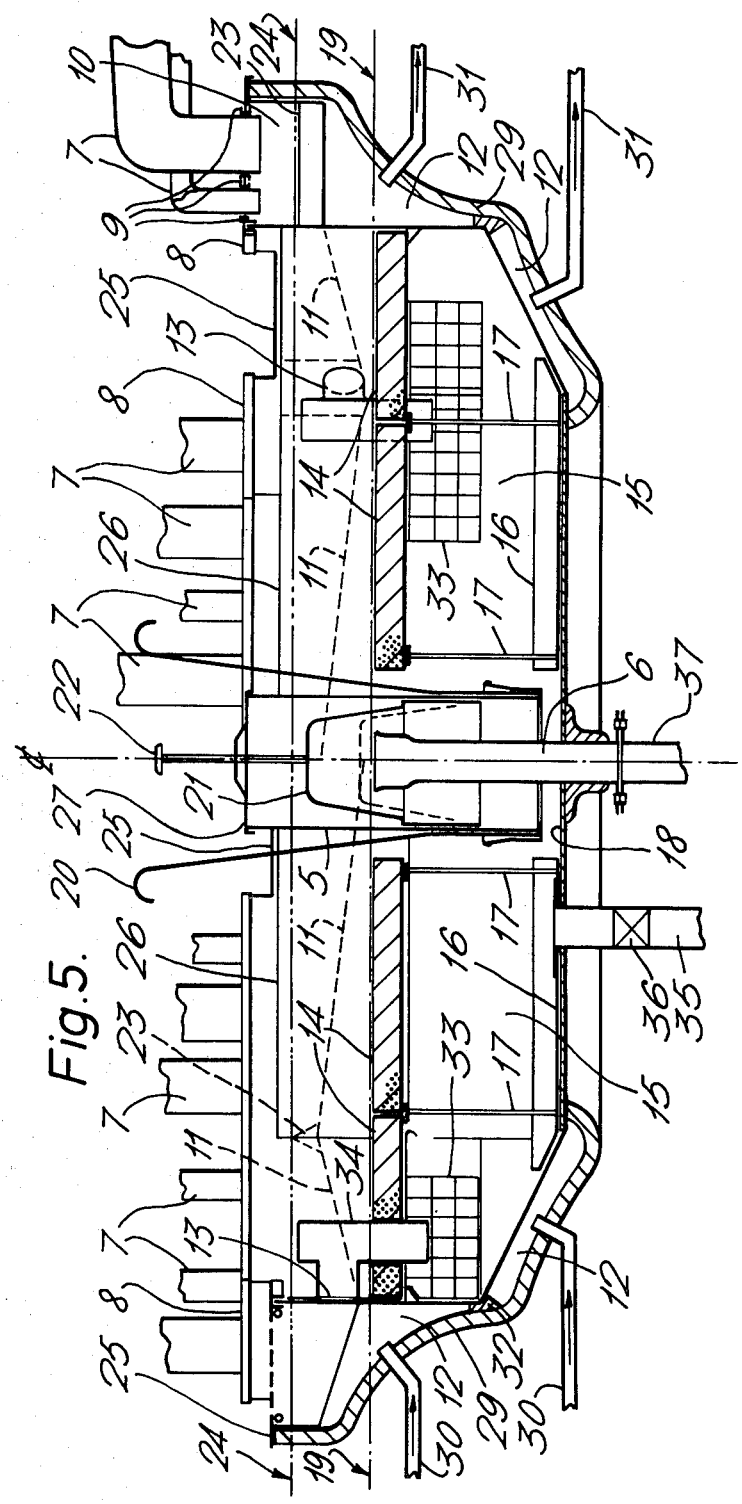

TRAP FOR GREASE OR OTHER FOREIGN MATTER DISSOLVED OR ENTRAINED IN A LIQUID

THIS invention relates to the trapping of grease or other foreign matter dissolved or entrained in liquids. More particularly, the invention is primarily concerned with the treatment of waste water prior to the discharge of the water into a drainage system.

The invention is also very useful and adaptable for other industrial uses, such as, for example, the recovery of petroleum oils, mineral oils and vegetable oils from a liquid bearing these products.

In one known type of grease trap hot waste liquid is fed to the base of the trap. The grease rises to the surface of the liquid within the apparatus where it cools and solidifies and the liquid is drained from the trap. In existing traps the surface area is quite inadequate to facilitate effective heat transfer from the hot greasy waste to the colder surrounding atmosphere. A perforated basket or galvanised iron tray is provided in known apparatus of this type to facilitate the removal of solidified or semi-solidified grease. The basket is periodically removed and cleaned. In general, the efficiency of this type of grease trap is low.

It is an object of the present invention to provide an improved trap for these purposes.

A trap for grease or other foreign matter dissolved or entrained in liquids according to the invention comprises a housing; a chamber within the housing; at least one port in the housing to admit liquid into the chamber; a settling tank; a channel for conducting the liquid from the chamber to an inlet to the settling tank, the channel being formed to reduce the turbulence of the liquid as it is conducted to the settling tank; and an outlet for draining decontaminated liquid from the settling tank.

Further according to the invention the chamber is at a higher level than the settling tank and the channel slopes gently downwardly from the chamber to the settling tank. Preferably, the inlet to the settling tank is below the normal surface level of liquid in the settling tank.

Further according to the invention the trap has a grease collector housed within the settling tank.

The invention also provides means to withdraw from the surface of the liquid in the settling tank liquids of lower specific gravity than the main volume of liquid in the tank. Suitably, the means is a suction pump system.

Further according to the invention the grease trap has a tray located at the base of the settling tank to collect sediment. The invention also provides a cage to trap trash located at the inlet to the settling tank. Preferably, the tray, the grease collector and the cage are all removable from the settling tank.

Preferably, the channel is arcuate and at least part of its base is canted transversely towards the inner side of the arc of the channel. Preferably, the base of the channel is gradually and progressively canted as it extends from the chamber to the inlet of the tank to form a ramped glide.

The outlet for decontaminated liquid is preferably located in the zone of the base of the tank and is communicable with a liquid seal contained in a baffle which also houses the inlet and upper end zone of a discharge pipe for conducting the decontaminated liquid to the drain. The inlet to the discharge pipe establishes the liquid level within the tank. Preferably, the baffle is cylindrical and its bore is occluded by a syphonic bell movable within the baffle between a first position in which it is substantially clear of the inlet of the discharge pipe and a second position in which it is juxtaposed that inlet to form a syphon adapted to evacuate the liquid from the tank and pass it to the drain through the discharge pipe. The syphonic bell also serves to prevent foul gases which may possibly rise from the drain from escaping from the baffle.

In one form of the invention the inlet to the tank and the outlet from the tank are controlled by penstocks.

Further according to the invention, means are provided to cool the liquid. The means may comprise a heat exchanger which is juxtaposed the channel and/or the tank and is adapted to be refrigerated. Conveniently, the heat exchanger may be a jacket embracing part of the channel and the tank, and may be adapted to allow a refrigerant to be passed through it.

The apparatus of the invention may be constructed in modular form, each module comprising a housing of substantially segmental shape in plan. A plurality of such housings may be interconnected with a common liquid seal baffle and discharge pipe to form a fully assembled unit. According to this aspect of the invention the juxtaposed zones of interconnected housings are formed with weirs so that when the liquid within one housing rises to the top of its weir it cascades over its weir into a neighbouring housing. This ensures a balance control of liquid between all interconnected housings. Preferably, a unit of assembled housings describes in plan an all but complete circle, or polygon, one housing or part housing being omitted so that easy access may be gained to the apparatus. The smaller size segmental housing (for example 1/8th of a circle) permits a more flexible volumetric change by the addition of one or more of the larger size segmental housings (for example 1/4 of a circle). In addition a small size housing may be used by itself for domestic purposes.

The invention is further described by way of example with reference to the accompanying drawings in which:

FIG. 1 is an exploded plan of an assembly formed from three complete segmental modular housings and one partial segmental modular housing according to the invention.

FIG. 2 is also a plan view of the apparatus illustrated in FIG. 1 when the housings are integrated to form an assembled unit.

FIG. 3 is a plan view of a cover for one of the housings illustrated in FIGS. 1 and 2.

FIG. 4 is a plan view on an enlarged scale of one housing illustrated in FIGS. 1 and 2, together with a baffle and discharge pipe which are common to all the housings of the unit illustrated in FIGS. 1 and 2.

FIG. 5 is a sectional view on an enlarged scale along the section line A—A of FIG. 1.

Figure 6:
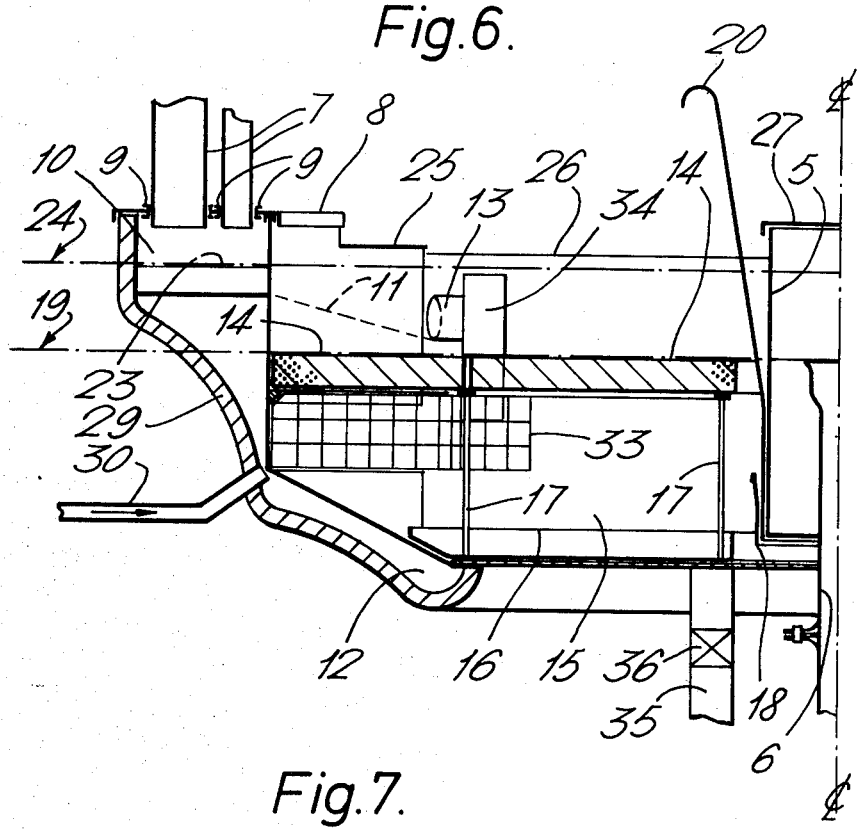
FIG. 6 is a sectional view on an enlarged scale along the section line B—B of FIG. 1.

Referring to FIGS. 1 and 2 the fully assembled unit comprises four segmental modular housings designated respectively 1, 2, 3 and 4. Housing 4 is one half of the size of each of the housings 1, 2 and 3. This variation in size allows easy access to the fully assembled unit. Each of the housings 1, 2, 3 and 4 has a common baffle 5 which accomodates a discharge pipe 6 leading to a drain through an outlet 37.

Figure 7:
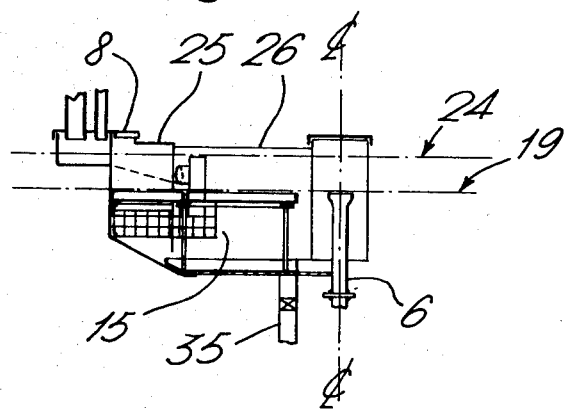
FIG. 7 is a sectional view on a reduced scale along the section line B—B of FIG. 1.

Referring to FIGS. 4, 5, 6 and 7, waste liquid together with dissolved and/or entrained grease and foreign matter gravitates through pipes 7 passing through ports 32 in covers 8 sealed with rubber grommets 9 into receiving chambers 10. The liquid flows from the chambers 10 under the action of gravity down a channel 11, the base of the channel being in the form of a ramped glide which is cooled by a heat exchange jacket 12. The liquid enters tanks 15 through a "T" entry 34 fitted to ports 13. The "T" entry 34 discharges the liquid below the true water level 19 to minimise turbulence. The surface area of each tank 15 is made as large as possible consistent with design limitations to facilitate effective heat transfer from the hot greasy waste liquids to the colder surrounding atmosphere.

A cage 33 is adapted to retain trash which enters the tank 15 from the channel 11. Grit, sludge and other foreign matter which are of a greater specific gravity than the liquid and which pass through the cage 33 settle in trays 16 at the base of the tanks 15. Struts 17 fixed to the tray 16 support grease baskets 14, which are removable.

The heat exchange jacket 12 at the lower level cools the liquid within the tanks 15 below the grease baskets 14 so causing the grease to solidify and float up through the perforations in the floor of the baskets 14.

The decontaminated liquid then passes through slotted outlets 18 at the bottom of the baffle 5 and then rises to the open top or inlet of the discharge pipe 6 which is connected to a drain through its outlet 37. The open end or inlet of the discharge pipe 6 establishes the true water level 19 within the tank 15.

In the case of recovery of petroleum oils, mineral oils, vegetable oils and other liquids of a lesser specific gravity than the main volume of liquid in the settling tank it may be possible to dispense with the baskets 14 and perhaps also the cage 33 and the trays 16 depending on the extent of contamination of the liquid to be treated. In this case, means such as a suction pump system (not shown) would be provided to withdraw and recover the surface liquids in the settling tank.

The following procedure is adopted for servicing the installation when the assembly consists of more than one segmental module such as, for example, illustrated in FIG. 2.

Penstocks (not shown) adapted to occlude the ports 13 which sense the "T" entries 34 are in the open position. Similarly, the penstocks 20 which are adapted to occlude the outlets 18 are also open.

A syphonic bell 21 is depressed smartly by means of plunger handle 22. This immediately starts a syphonic action which causes all liquid in the housings 1, 2, 3 and 4 to be rapidly exhausted through the outlet 37 of the discharge pipe 6.

Syphonic exhaustion is not essential. The penstocks 20 may be dispensed with and replaced by an outlet 35 controlled by stopcock 36.

Servicing of the installation is carried out separately in each housing. Referring first to housing 1 as illustrated in FIG. 4 and the left hand section of FIG. 5 the penstock (not shown) for the port 13 and the penstock 20 controlling the slot 18 of the housing 1 are closed. The baskets 14 containing grease and the cage 33 holding trash are removed from the housing 1 and the contents are disposed of. Similarly, the sludge and grit trays 16 are removed and the contents discharged. After cleaning, the baskets 14, cage 33 and the trays 16 are replaced in the housing 1.

Under certain conditions it may be advantageous not to exhaust the decontaminated liquid from the tank 15. This is because the liquid in the tank 15 buoys up the baskets 14 and the trays 16 and so facilitates their removal.

While the cleaning of the housing 1 is being carried out the waste liquids can continue to be received in the chambers 10 through the pipes 7 in each of the housings 1, 2, 3 and 4. As the penstock (not shown) of the housing 1 is occluding the port 13 the liquid will rise in the channel 11 and in the chamber 10 until it reaches the top of a weir 23 which establishes the flood level 24. When this level is reached in housing 1 the liquid will cascade over its weir 23 and the weir of the adjacent housing 2. As the penstock (not shown) in the channel 11 and the penstock 20 controlling the slotted outlet 18 of the housing 2 are at this stage open the liquid which has cascaded into the housing 2 will be treated in the manner already described. Should the liquid entering the housing 2 rise to the true water level 19 any further liquid received by the housing flows down the discharge pipe 6 through the outlet 37 to the drain.

The port 13 of housing 1 is then opened and a rodent proof cover 25 over the channel 11 of housing 1 is removed to expose the entire surface of the ramped glide and the receiving chambers 10 of housing 1 for cleaning. After this operation the cover 25 is replaced.

The penstock 20 controlling the slot 18 of housing 1 is then opened. This housing is rapidly filled with liquid from the remaining housings.

Housings 2, 3 and 4 can then be successively serviced in the manner described above. When all housings have been serviced the various penstocks are removed or opened so that the ports 13 and the outlets 18 allow a full free flow of liquid.

To ensure that no accidental flooding occurs which could be caused by leaving all outlets 18 closed the number of penstocks 20 supplied with each complete unit is one less than the number of outlets 18. A similar provision applies to the number of penstocks for controlling the ports 13.

When only one housing is used in an installation, the vertical perimeter walls 26 are increased in height to the level of the top of the receiving chamber 10. This permits temporary storage of liquid for a limited time to obviate flooding in the event of a contributing fitting being accidentally used during the time of servicing.

Liquid cannot pass over the flood water level 24 when more than one housing is installed as any build-up of liquid will flow over the weirs 23 to be discharged in the manner already described through the adjacent housing.

It should, however, be noted that when a void is left between adjacent housings such as that between housings 1 and 4, as illustrated in FIGS. 1 and 2, the adjacent perimeter walls 26 of such housings are also increased in height to the level of the top of the adjacent receiving chambers 10.

To clean the discharge pipe 6 which is connected at its outlet 37 to the main drain (not shown) the cover 27 (FIGS. 5 and 6) and the handle 22 are removed. The syphonic bell 21 is then withdrawn thus permitting easy rodding through the open top end of the discharge pipe 6.

On completion of servicing, rodent proof covers 25 (FIG. 3) are replaced over each segment.

The invention prevents the escape of foul air or gases from the drain pipe 6 once the syphonic bell 21 has been replaced and the water seal has been re-established after the liquid reaches the level within the baffle 5 at the bottom edge of the syphonic bell 21. The bell 21 must be retained to prevent the escape of foul air even if syphonic exhaustion is dispensed with as described above.

The heat exchange jackets 12 which are held in spaced relationship with the tanks 15 by means of separators are lagged on the outside with insulation 29. Refrigerant is introduced to the jacket at the desired rate for circulation through supply pipe 30 and is exhausted through return pipe 31 for recooling and recirculation.

In the case of water being used as a refrigerant it may be frozen to ice in a lagged storage tank (not shown) during off peak periods of contribution of hot greasy liquids to the trap. In this way the return cooling water would pass over this ice which would melt to be recirculated through the circuit. This process considerably reduces the size of the necessary compressor refrigeration units and the required electric power.

Alternatively, the return water can be employed to provide a supply of heated water which if required can be utilised for domestic or industrial purposes.

We claim:

1. A trap for grease or other foreign matter dissolved or entrained in liquids, comprising a chamber disposed about the periphery of said trap, at least one port to admit liquid into the upper portion of said chamber; a central settling tank encompassed by said chamber; said chamber having a bottom wall that inclines downwardly inwardly towards said settling tank for conducting the liquid from said chamber to an inlet to the settling tank, thereby to reduce the turbulence of the liquid as it is conducted from said chamber to said settling tank; said trap being segmental in plan and being comprised of a plurality of mutually separable segments each of which includes a portion of said chamber and a portion of said settling tank, overflow weirs in each segment providing limited fluid communication between adjacent said portions of said chamber, said weirs being of such a height that excess liquid in any chamber portion will overflow said weirs before overflowing out of said trap, and an outlet constructed and arranged for removing decontaminated liquid from said settling tank.

2. A trap according to claim 1 having a removable grease collector housed within the settling tank.

3. A trap according to claim 1 wherein the liquid outlet is located at the base of the settling tank and is in communication with a liquid seal contained in a baffle which houses the inlet and upper end zone of a discharge pipe used for conducting the decontaminated liquid to a drain.

4. A trap according to claim 3 wherein the baffle is a hollow tube the bore of which is adapted to be occluded to prevent the escape of foul gases.

5. A trap according to claim 3 wherein the baffle is cylindrical, its bore being occluded by a syphonic bell movable within the baffle between a first position at which it is substantially clear of the inlet of the discharge pipe and a second position at which it is juxtaposed the inlet to form a syphon which causes liquid to be syphoned from the settling tank down the discharge pipe through its outlet to the drain.

6. A trap according to claim 1 which includes penstocks to control the inlet to and the outlet from the settling tank.

7. A trap according to claim 1 which includes means to cool the liquid in the trap.

8. A trap according to claim 1 wherein said chamber is annular.

9. A trap according to claim 1 wherein said bottom wall of each said chamber portion is gradually and progressively inclined downwardly toward said inlet to the settling tank about a portion of the periphery of the trap so as to form a ramp glide.

10. A trap according to claim 1, in which said outlet is common to all said segments.

11. A trap as claimed in claim 1, in which said segments are arranged to describe in plan an all but complete figure.

12. A trap as claimed in claim 11, in which said segments are all substantially the same size except for one segment which is half the size of the other segments.

* * * * *